US008489995B2

(12) United States Patent
von Eicken et al.

(10) Patent No.: US 8,489,995 B2
(45) Date of Patent: Jul. 16, 2013

(54) SYSTEMS AND METHODS FOR EFFICIENTLY MANAGING AND CONFIGURING VIRTUAL SERVERS

(75) Inventors: Thorsten von Eicken, Santa Barbara, CA (US); Rafael Saavedra, Santa Barbara, CA (US)

(73) Assignee: Rightscale, Inc., Santa Barbara, CA (US)

( * ) Notice: Subject to any disclaimer, the term of this patent is extended or adjusted under 35 U.S.C. 154(b) by 692 days.

(21) Appl. No.: 12/050,865

(22) Filed: Mar. 18, 2008

(65) Prior Publication Data
US 2009/0241030 A1 Sep. 24, 2009

(51) Int. Cl.
*G06F 15/177* (2006.01)

(52) U.S. Cl.
USPC .......................... 715/735; 709/222; 718/104

(58) Field of Classification Search
USPC .................................................. 715/735, 736
See application file for complete search history.

(56) References Cited

U.S. PATENT DOCUMENTS

| | | | |
|---|---|---|---|
| 6,598,075 B1 | 7/2003 | Ogdon et al. | |
| 6,978,232 B1 * | 12/2005 | Tobler | 703/21 |
| 7,080,378 B1 * | 7/2006 | Noland et al. | 718/104 |
| 7,102,996 B1 | 9/2006 | Amdahl et al. | |
| 7,139,728 B2 * | 11/2006 | Rigole | 705/10 |
| 7,200,622 B2 * | 4/2007 | Nakatani et al. | 1/1 |
| 7,299,276 B1 | 11/2007 | Strawn | |
| 7,318,100 B2 | 1/2008 | Demmer et al. | |
| 7,356,679 B1 * | 4/2008 | Le et al. | 713/1 |
| 7,433,935 B1 | 10/2008 | Obert | |
| 7,702,971 B2 * | 4/2010 | Nguyen et al. | 714/704 |
| 2001/0047415 A1 | 11/2001 | Skene et al. | |
| 2001/0052016 A1 | 12/2001 | Skene et al. | |
| 2003/0105810 A1 * | 6/2003 | McCrory et al. | 709/203 |
| 2003/0149755 A1 | 8/2003 | Sadot | |
| 2004/0078467 A1 | 4/2004 | Grosner et al. | |
| 2004/0103150 A1 | 5/2004 | Ogdon et al. | |
| 2005/0120160 A1 * | 6/2005 | Plouffe et al. | 711/1 |
| 2006/0184653 A1 * | 8/2006 | van Riel | 709/222 |
| 2007/0008974 A1 | 1/2007 | Dispensa et al. | |
| 2007/0011685 A1 | 1/2007 | Yim et al. | |

(Continued)

FOREIGN PATENT DOCUMENTS

WO WO-2008/112698 A2 9/2008

OTHER PUBLICATIONS

International Search Report from PCT/US2009/036764, mailed Jun. 7, 2009, 3 pages.

(Continued)

*Primary Examiner* — Kieu Vu
*Assistant Examiner* — Blaine Basom
(74) *Attorney, Agent, or Firm* — Foley & Lardner LLP; John D. Lanza

(57) ABSTRACT

The present invention is related to providing faster and more efficient ways to deploy and manage virtual server configurations in a hosted virtual server service. Broadly, a web interface allows a user to set conditions upon which specific types of virtual servers will be instantiated or terminated on a third-party hosted virtual server service. For example, the user may wish to instantiate a new virtual server each time the load on existing virtual servers exceeds a predetermined threshold. The web interface may also allow a user to select from among a plurality of hosted virtual server services. The web interface may further allow a user to incorporate dynamic variables into configurations of instantiated virtual servers.

25 Claims, 16 Drawing Sheets

U.S. PATENT DOCUMENTS

| | | | |
|---|---|---|---|
| 2007/0179955 | A1 | 8/2007 | Croft et al. |
| 2007/0233455 | A1 | 10/2007 | Zimmer et al. |
| 2007/0234346 | A1* | 10/2007 | Kramer et al. ............... 717/174 |
| 2007/0294669 | A1* | 12/2007 | Robalewski et al. ......... 717/120 |
| 2008/0034416 | A1 | 2/2008 | Kumar et al. |
| 2008/0049786 | A1 | 2/2008 | Ram et al. |
| 2008/0091792 | A1 | 4/2008 | Mei et al. |

OTHER PUBLICATIONS

International Preliminary Report on Patentability from PCT/US09/036764, mailed on Sep. 21, 2010, 1 page.

US Office Action on U.S. Appl. No. 12/025,519 dated Aug. 4, 2010.

US Office Action on U.S. Appl. No. 12/025,519 dated Feb. 2, 2011.

Written Opinion of the International Searching Authority, from PCT/US09/036764, dated Sep. 21, 5 pages.

International Search Report from PCT/US09/036764, mailed on Jul. 6, 2009, 3 pages.

International Preliminary Report on Patentability from PCT/US2009/036764, mailed Sep. 21, 2010.

Singapore Written Opinion on 201006680-1 dated Mar. 14, 2012.

Singapore Written Opinion on 201006680-1 dated Aug. 23, 2011.

Written Opinion of the International Searching Authority, from PCT/US2009/036764, dated Jun. 7, 2009, 6 pages.

* cited by examiner

*Fig. 5A*

Server Templates

Private

| Nickname | Image / User data | Updated | |
|---|---|---|---|
| Apache-Tomcat5 PHP Server v1 (mod) | RightImage CentOS5V1_10 | 2008-02-13 22:58:05 | |
| Hello World | RightImage CentOS5V1_6 | 2008-02-25 21:57:09 | |
| Httperf AutoScaling (LG) | RightImage CentOS5_X86_64_V1_12 | 2008-02-08 16:58:06 | |
| Master MySQL custom v2 | RightImage CentOS5V1_10 | 2007-09-26 17:25:30 | |
| Mephisto all-in-one DEV | RightImage CentOS5V1_10 | 2008-02-06 20:47:32 | |
| Mephisto all-in-one on Fedora | RightImage FC6V2 | 2008-02-06 20:47:32 | |
| MySQL Bootstrap v3 (mod) | RightImage CentOS5V1_10 | 2008-01-14 21:25:58 | |
| Rails all-in-one custom v2 | RightImage CentOS5V1_10 | 2007-12-12 23:14:01 | |
| Rails all-in-one v3 | RightImage CentOS5V1_10 | 2008-02-06 20:47:21 | |

Premium/Public

| Nickname | Image / User data | Updated | |
|---|---|---|---|
| Apache-Tomcat5 PHP Server v1 | RightImage CentOS5V1_10 | 2008-02-13 22:58:04 | |
| FaceBook Footprints Demo Server v1 | RightImage CentOS5V1_10 | 2007-12-12 23:14:01 | |
| Internal PHP App Server v1 | RightImage CentOS5V1_10 | 2008-02-07 22:12:19 | |

Fig. 5C

| Alert Spec | Condition | Derived from | Escalation | Enabled | Age | Actions |
|---|---|---|---|---|---|---|
| scale-up at 50% busy | if cpu-0/cpu-idle.value < '50' for 3 min then escalate to 'scale-up'. | - | | yes | - | |
| scale-down at 20% busy | if cpu-0/cpu-idle.value > '80' for 10 min then escalate to 'scale-down'. | - | scale-down | yes | 5m | |
| stranded | if EC2/server-failure.state == 'stranded' for 1 min then escalate to 'critical'. | | critical | yes | - | |
| rs instance terminated | if EC2/server.state == 'terminated' for 1 min then escalate to 'critical'. | Rails FrontEnd v3 | critical | yes | - | |
| rs instance stranded | if EC2/server-failure.state == 'stranded' for 1 min then escalate to 'warning'. | Rails FrontEnd v3 | warning | yes | - | |
| rs instance not responding | if cpu-0/cpu-idle.value == 'NaN' for 1440 min then escalate to 'warning'. | Rails FrontEnd v3 | warning | yes | - | |
| rs cpu busy | if cpu-0/cpu-idle.value < '15' for 60 min then escalate to 'warning'. | Rails FrontEnd v3 | warning | yes | - | |

SYSTEMS AND METHODS FOR EFFICIENTLY MANAGING AND CONFIGURING VIRTUAL SERVERS

BACKGROUND OF THE INVENTION

Hosted virtual server services allow users to instantiate virtual servers running software specified by the users without requiring a customer to own or manage the hardware underlying the virtual server instances. Virtual server services, including, for example, Amazon EC2, may enable users to instantiate a number of virtual servers of a variety of different configurations to match their needs.

Many virtual server services allow instantiation of virtual servers from bootable images provided by users. These images may contain the set of desired server software of the users. Some virtual server services allow the remote instantiation of virtual servers from bootable images provided by users, such as through a published API or a web interface. The remote instantiation capabilities in principle allow a user to scale up or down the number of instantiated virtual servers based on changing demand or other factors. However, it is typically not practical to personally monitor servers, decide when to launch additional servers, and configure them manually.

SUMMARY OF THE INVENTION

The present invention is related to providing faster and more efficient ways to deploy and manage virtual server configurations in a hosted virtual server service. Broadly, a web interface allows a user to set conditions upon which specific types of virtual servers will be instantiated or terminated on a third-party hosted virtual server service. For example, the user may wish to instantiate a new virtual server each time the load on existing virtual servers exceeds a predetermined threshold. The web interface may also allow a user to select from among a plurality of hosted virtual server services. The web interface may further allow a user to incorporate dynamic variables into configurations of instantiated virtual servers.

In one aspect, the present invention relates to a method for providing a configuration and instantiation interface to a hosted virtual server service. In one embodiment, a method includes: providing an interface to a hosted virtual server service, the interface comprising: inputs for a user to select a virtual server configuration among a plurality of virtual server configurations; and inputs for a user to set a policy for dynamically instantiating virtual servers, the policy comprising at least one condition; determining that the at least one condition has been met; and transmitting, to the hosted virtual server service, instructions to instantiate a virtual server according to the selected virtual server configuration. In some embodiments, the method may include transmitting values of user-specified variables to the instantiated virtual server. In some embodiments, the method may include terminating one or more virtual servers in response to a measurement. In some embodiments, the method may include selecting among a number of hosted virtual server services to instantiate the virtual server based upon a user-defined policy.

In another aspect, the present invention relates to a system for providing a configuration and instantiation interface to a hosted virtual server service. In one embodiment, a system includes: a web server which provides an interface to a hosted virtual server service, the interface comprising: input means for a user to select a virtual server configuration among a plurality of virtual server configurations; and input means for a user to set a policy for dynamically instantiating virtual servers, the policy comprising at least one condition; a computing device, in communication with the web server, which determines that the at least one condition has been met; and transmits, to the hosted virtual server service, instructions to instantiate a virtual server according to the selected virtual server configuration.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIGS. 5A, 5B, 5C, 5D, 5E, 5F, and 5G are example screenshots of one embodiment of a configuration and instantiation interface to a hosted virtual server service;

DETAILED DESCRIPTION OF THE INVENTION

Figure 1A:
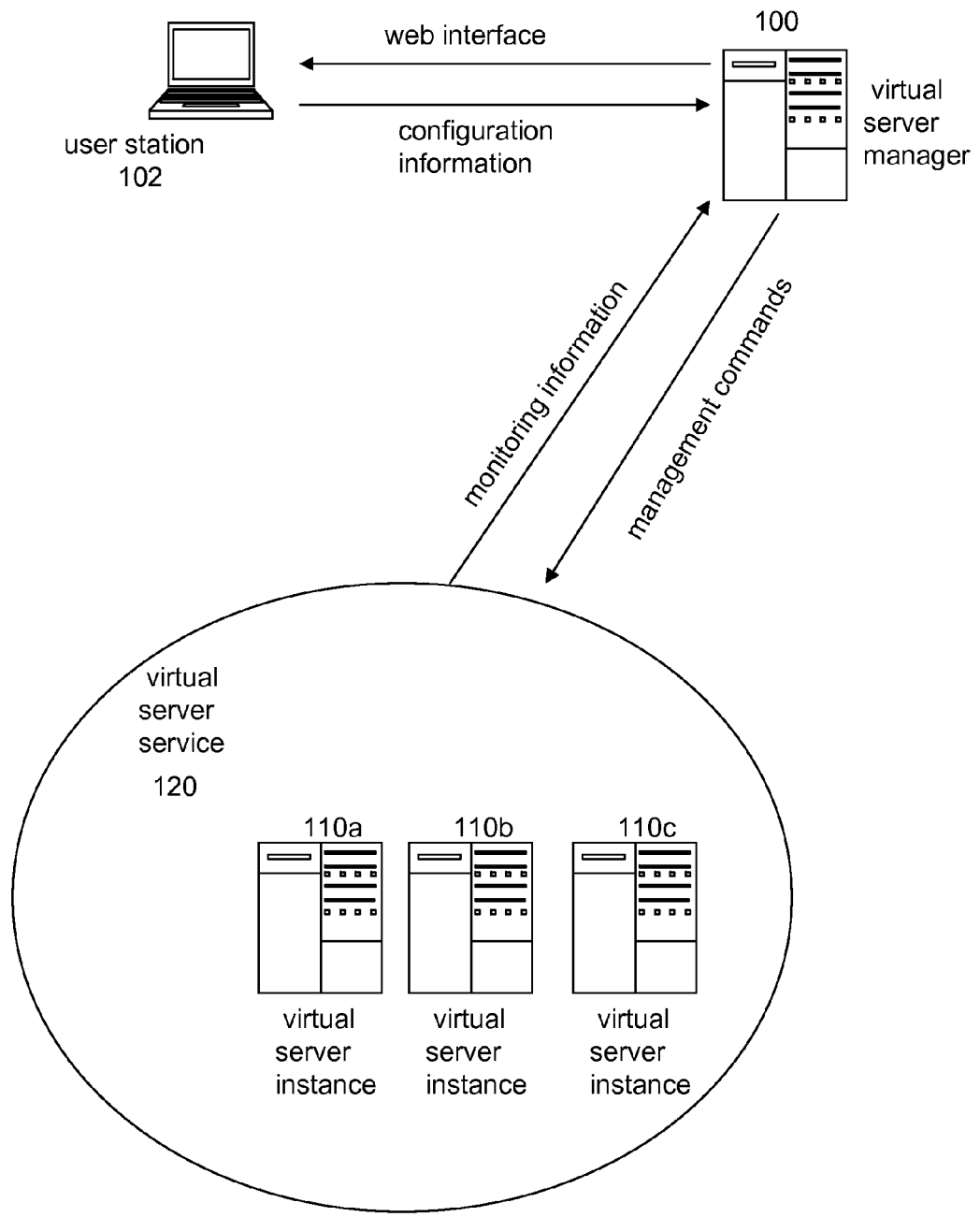
FIG. 1A is a block diagram of one embodiment of a network setting enabling the management of virtual servers.

Referring now to FIG. 1A, a block diagram of one embodiment of a network setting enabling the management of virtual servers is shown. In brief overview, a user station 102 displays a web interface to a user and transmits configuration information from the user to a virtual server manager 100 (also referred to herein as simply a "manager"). The virtual server manager 100 manages instantiation, configuration, and termination of virtual server instances 110a, 110b, 110c (generally 110). The manager 100 may monitor any data received from the instances 110 or the hosted virtual server service 120. Still referring to FIG. 1A, now in greater detail, the virtual server manager 100 may comprise any computer device capable of receiving one or more virtual server images and accompanying configuration information. In some embodiments, the virtual server manager may comprise a single server; in other embodiments, the virtual server manager 100 may comprise a server cluster. In some embodiments, the manager 100 may have one or more associated databases for storing configuration information and/or virtual server images. These databases may be segregated by user, such that different users of the manager 100 can store various images without interfering with images stored by other users.

In some embodiments, users may be permitted to share images and/or configuration information stored on a manager 100.

In some embodiments, the virtual server manager 100 may be operated on a subscription basis. For example, a company may charge users to store one or more images on the manager, and to use the manager to instantiate one or more servers on the hosted service. In some embodiments, the virtual server manager 100 may be operated by an entity independent from the virtual server service. In some embodiments, the user station may communicate with the manager 100 via a web interface. For example, a manager 100 may provide a web interface for a number of companies to manage their virtual server deployments on a hosted virtual server service. For example, a company running the manager 100 may charge a flat fee for a company to use the services of the manager 100 in initiating virtual servers. Or for example, a company running the manager 100 may charge a pro-rated fee based on how many base images or configuration profiles are created and/or stored using the manager 100. Or for example, a company running the manager 100 may charge a monthly fee for use of the control features offered by the manager in operating and instantiating virtual servers. Or for example, a company running the manager 100 may charge a fee based on the amount of time any virtual servers managed have been running.

A virtual server service 120 may comprise any service allowing one or more users to instantiate virtual servers on resources hosted by the virtual server service 120. Examples of virtual server services include the EC2 service offered by Amazon, Inc. and FLEXISCALE, offered by XCalibre Communications Ltd. In some embodiments, a manager 100 may be specifically designed to work with a single virtual server service. In other embodiments, a manager 100 may provide an interface to a plurality of virtual server services.

Figure 1B:
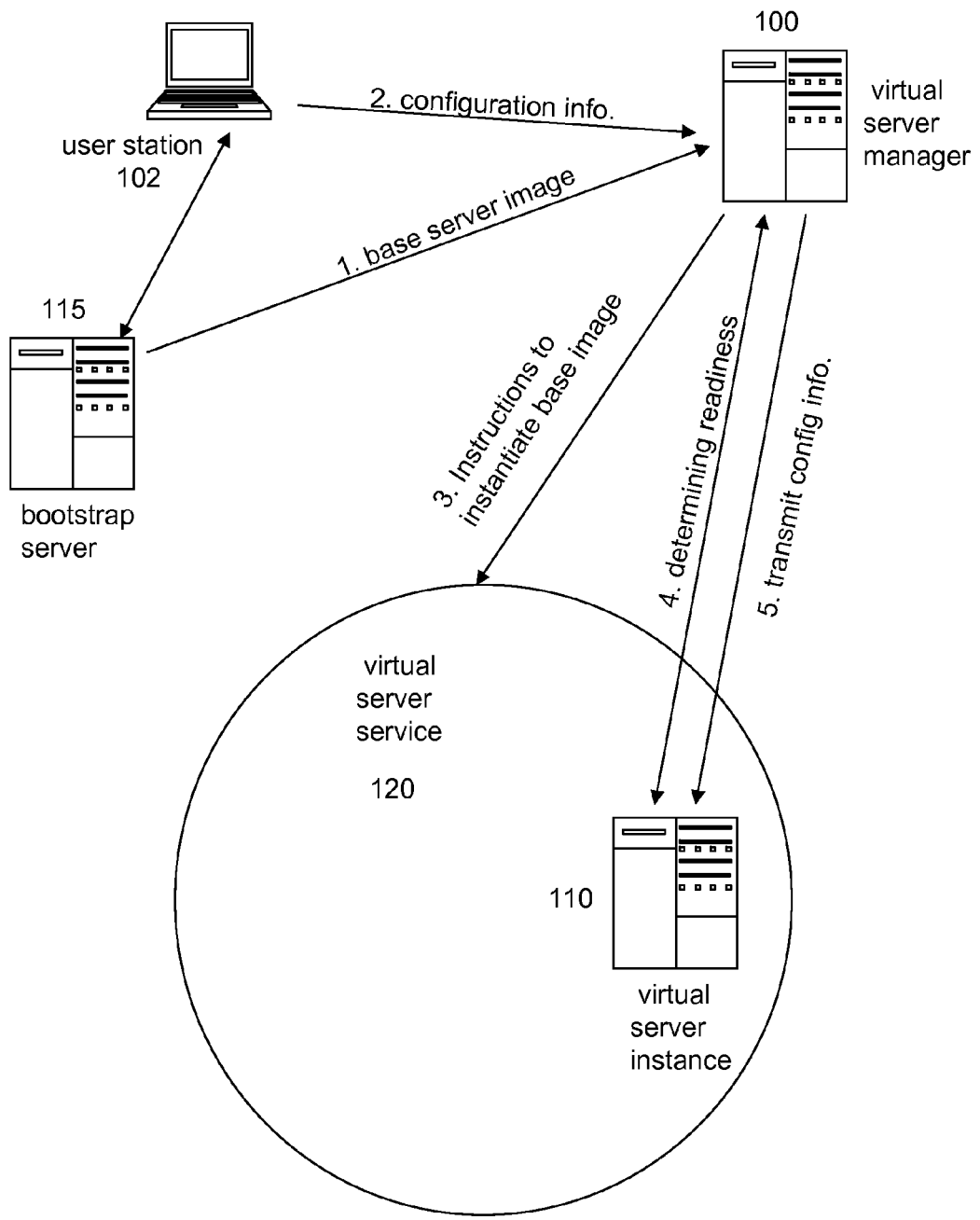
FIG. 1B is a block diagram of one embodiment of a network setting enabling the creation of configurable virtual server instances from machine images.

Referring now to FIG. 1B, one embodiment of a network setting enabling the creation of configurable virtual server instances from machine images is shown. In brief overview, a user station 102 accepts input from a user specifying a boot image, which is created on a bootstrap server 115. The base server image is then sent to a virtual server manager 100. At a separate time, configuration information may be received from the user station 102 or a different user station 102. The virtual server manager 100 sends the virtual server service 120 instructions to instantiate an instance of the boot image. After determining that instance 110 is ready, the manager 100 sends the received configuration information to the virtual server instance. In this manner, configuration of a virtual server instance is decoupled from the process of building a server image.

Still referring to FIG. 1B, now in greater detail, a user station 102 may provide any functionality for a user to create boot images for virtual servers. In some embodiments, the user station 102 may be coupled with a bootstrap server 115 which compiles or otherwise generates the virtual server images. In other embodiments, the virtual server images may be created on the user station 102 itself. Both the user station 102 and bootstrap server 115 may comprise any computing devices.

The user station, manager 100, and virtual server service 120 may be connected in any manner, and via any network or networks. Connections and networks included in the connections may comprise the Internet, local networks, web servers, file servers, routers, databases, computers, servers, network appliances, or any other computing devices capable of sending and receiving information. A network may comprise computing devices connected via cables, infrared ports, wireless signals, or any other means of connecting multiple computing devices. A network and any devices connected to the networks may communicate via any communication protocol used to communicate among or within computing devices, including without limitation SSL, BitTorrent, HTML, XML, RDP, ICA, FTP, HTTP, SIP, XMPP (also known as Jabber), TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g, IEEE 802.11n, WiMax and direct asynchronous connections, or any combination and/or extensions thereof. The network may comprise mobile telephone networks utilizing any protocol or protocols used to communicate among mobile devices, including AMPS, TDMA, CDMA, GSM, GPRS or UMTS.

Figure 2A:
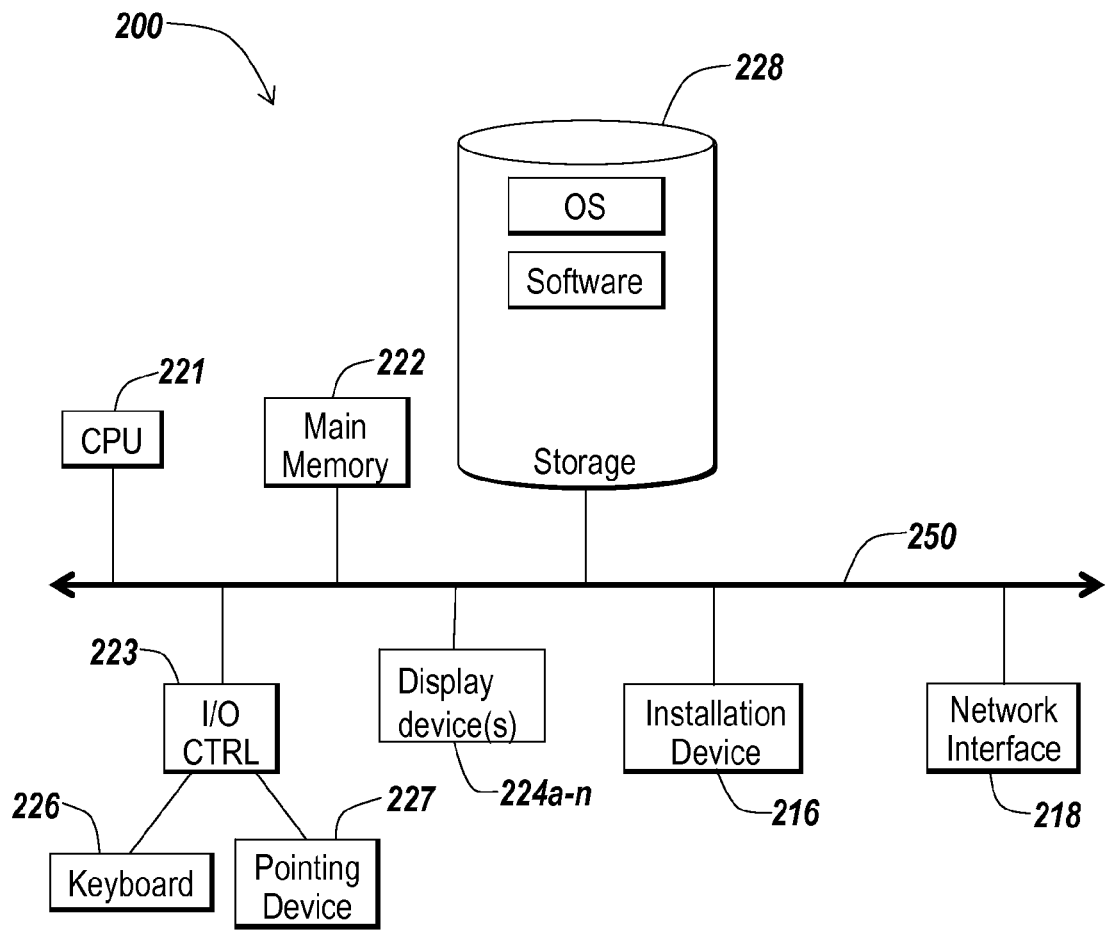
FIGS. 2A and 2B are block diagrams of a typical computer 200 useful as client computing devices and server computing devices.
Figure 2B:
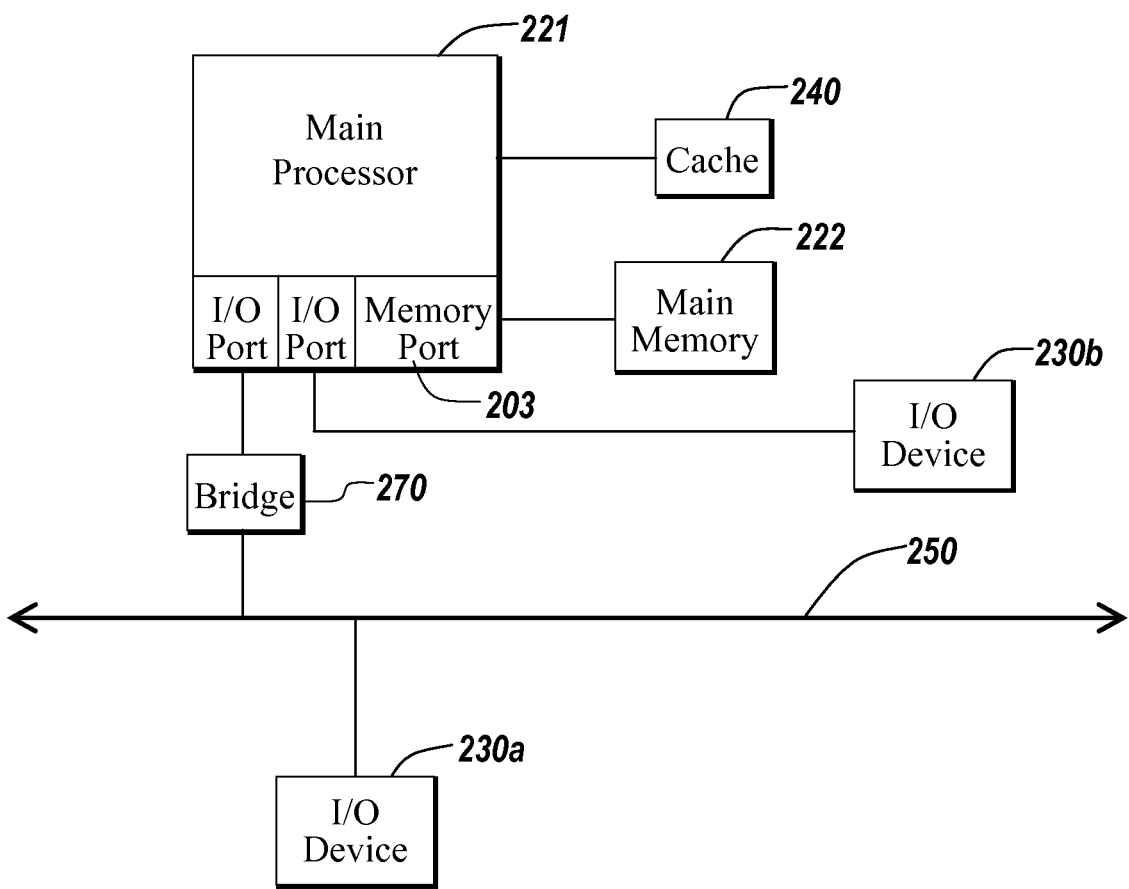

FIGS. 2A and 2B depict block diagrams of a computing device 200 useful for practicing an embodiment of the client 102 or a server. A client 102 and server may be deployed as and/or executed on any type and form of computing device, such as a computer, network device or appliance capable of communicating on any type and form of network and performing the operations described herein. As shown in FIGS. 2A and 2B, each computing device 200 includes a central processing unit 221, and a main memory unit 222. As shown in FIG. 2A, a computing device 200 may include a visual display device 224, a keyboard 226 and/or a pointing device 227, such as a mouse. As shown in FIG. 2B, each computing device 200 may also include additional optional elements, such as one or more input/output devices 230a-230b (generally referred to using reference numeral 230), and a cache memory 240 in communication with the central processing unit 221.

The central processing unit 221 is any logic circuitry that responds to and processes instructions fetched from the main memory unit 222. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein.

Main memory unit 222 may be one or more memory chips capable of storing data and allowing any storage location to be directly accessed by the microprocessor 221, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC200 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 222 may be based on any of the above described memory chips, or any other available memory chips capable of operating as described herein. In the embodiment shown in FIG. 2A, the processor 221 communicates with main memory 222 via a system bus 250 (described in more detail below). FIG. 2B depicts an embodiment of a computing device 200 in which the processor communicates directly with main memory 222 via a memory port 203. For example, in FIG. 2B the main memory 222 may be DRDRAM.

FIG. 2B depicts an embodiment in which the main processor 221 communicates directly with cache memory 240 via a secondary bus, sometimes referred to as a backside bus. In other embodiments, the main processor 221 communicates with cache memory 240 using the system bus 250. Cache memory 240 typically has a faster response time than main memory 222 and is typically provided by SRAM, BSRAM, or EDRAM. In the embodiment shown in FIG. 2B, the processor 221 communicates with various I/O devices 230 via a local system bus 250. Various buses may be used to connect the central processing unit 221 to any of the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 224, the processor 221 may use an Advanced Graphics Port (AGP) to communicate with the display 224. FIG. 2B depicts an embodiment of a computer 200 in which the main processor 221 communicates directly with I/O device 230b via HyperTransport, Rapid I/O, or InfiniBand. FIG. 2B also depicts an embodiment in which local busses and direct communication are mixed: the processor 221 communicates with I/O device 230a using a local interconnect bus while communicating with I/O device 230b directly.

The computing device 200 may support any suitable installation device 216, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 200 may further comprise a storage device, such as one or more hard disk drives or redundant arrays of independent disks, Flash memory, or EEPROMs, for storing an operating system and other related software, and for storing application software programs. Optionally, any of the installation devices 216 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 200 may include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols. In one embodiment, the computing device 200 communicates with other computing devices 200 via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 218 may comprise a built-in network adapter, network interface card, PCMCIA network card, card bus network adapter, wireless network adapter, USB network adapter, modem or any other device suitable for interfacing the computing device 200 to any type of network capable of communication and performing the operations described herein.

A wide variety of I/O devices 230a-230n may be present in the computing device 200. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 223 as shown in FIG. 2A. The I/O controller may control one or more I/O devices such as a keyboard 226 and a pointing device 227, e.g., a mouse or optical pen. Furthermore, an I/O device may also provide storage and/or an installation medium 216 for the computing device 200. In still other embodiments, the computing device 200 may provide USB connections to receive handheld USB storage devices such as the USB Flash Drive line of devices manufactured by Twintech Industry, Inc. of Los Alamitos, Calif.

In some embodiments, the computing device 200 may comprise or be connected to multiple display devices 224a-224n, which each may be of the same or different type and/or form. As such, any of the I/O devices 230a-230n and/or the I/O controller 223 may comprise any type and/or form of suitable hardware, software, or combination of hardware and software to support, enable or provide for the connection and use of multiple display devices 224a-224n by the computing device 200. For example, the computing device 200 may include any type and/or form of video adapter, video card, driver, and/or library to interface, communicate, connect or otherwise use the display devices 224a-224n. In one embodiment, a video adapter may comprise multiple connectors to interface to multiple display devices 224a-224n. In other embodiments, the computing device 200 may include multiple video adapters, with each video adapter connected to one or more of the display devices 224a-224n. In some embodiments, any portion of the operating system of the computing device 200 may be configured for using multiple displays 224a-224n. In other embodiments, one or more of the display devices 224a-224n may be provided by one or more other computing devices, such as computing devices 200a and 200b connected to the computing device 200, for example, via a network. These embodiments may include any type of software designed and constructed to use another computer's display device as a second display device 224a for the computing device 200. One ordinarily skilled in the art will recognize and appreciate the various ways and embodiments that a computing device 200 may be configured to have multiple display devices 224a-224n.

In further embodiments, an I/O device 230 may be a bridge between the system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 200 of the sort depicted in FIGS. 2A and 2B typically operates under the control of operating systems, which control scheduling of tasks and access to system resources. The computing device 200 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Washington; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 200 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 102 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif., or the IPHONE family of devices manufactured by Apple Computer. In still further embodiments, the mobile device is a cellular telephone that operates under control of the PocketPC operating system, such as the MPx200, manufactured by Motorola Corp. In still other embodiments, a mobile device may comprise a mobile gaming device with wireless communication capability. A typical mobile device may comprise many of the elements described above in FIGS. 2A and 2B, including the processor and the main memory.

Figure 3:
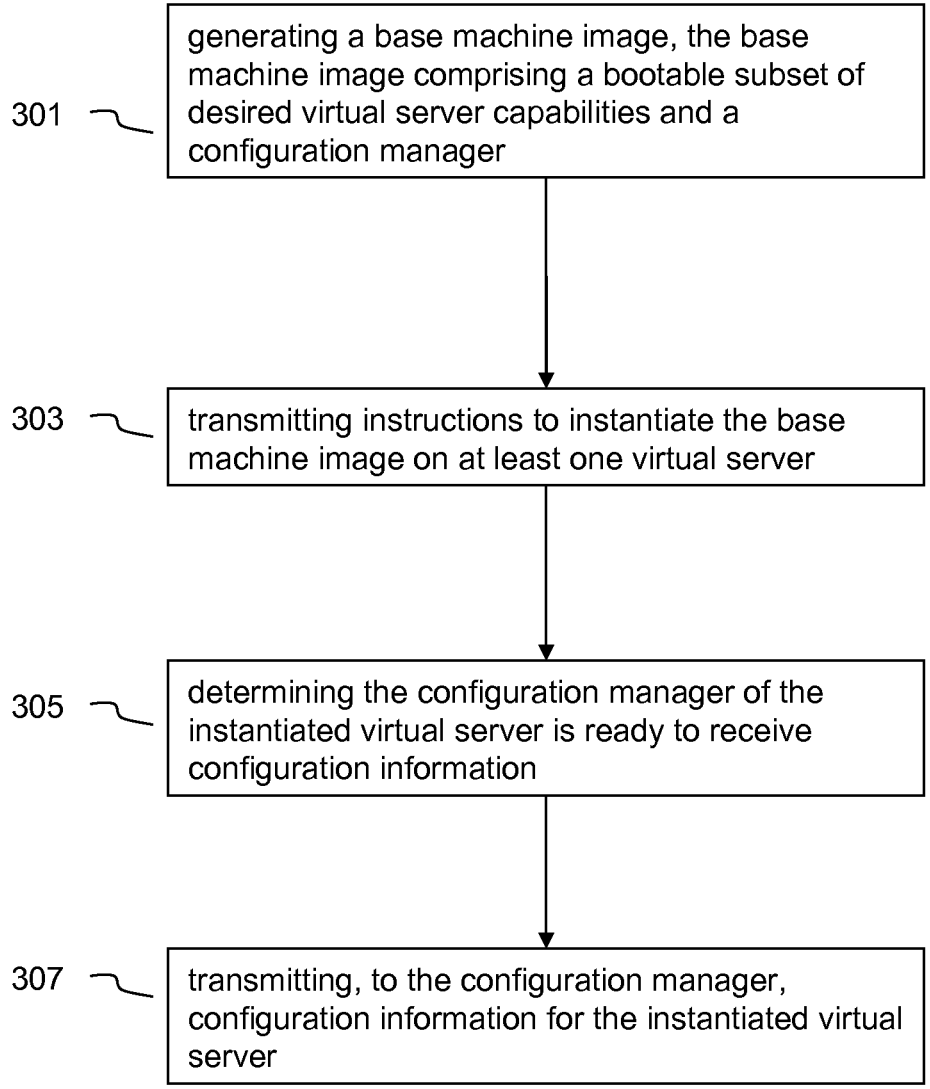
FIG. 3 is a flow diagram illustrating a method for facilitating the creation of configurable virtual server instances from machine images.

Referring now to FIG. 3, a flow diagram illustrating a method for facilitating the creation of configurable virtual server instances from machine images is shown. In brief overview, the method comprises: generating a base machine image, the base machine image comprising a bootable subset of desired virtual server capabilities and a configuration manager (step 301); transmitting instructions to instantiate the base machine image on at least one virtual server (step 303); determining the configuration manager of the instantiated virtual server is ready to receive configuration information (step 305); and transmitting, to the configuration manager, configuration information for the instantiated virtual server (step 307).

Still referring to FIG. 3, now in greater detail, a base machine image having a bootable subset of desired virtual server capabilities and a configuration manager may be created in any manner (step 301);. The bootable subset may comprise any subset of virtual server capabilities, including without limitation an operating system, HTTP server, file unzipping/unpacking utilities, scripting language support, and encryption/decryption utilities. In some embodiments, a machine image may be created by including the configuration manager in the build process including the virtual server capabilities. In other embodiments, a machine image may be created by modifying an existing machine image. In these embodiments, a configuration manager may be already present on a running virtual server booted from that machine image or one may be installed, and then a new machine image may be taken of the running virtual server.

The configuration manager may comprise any utilities for configuring a virtual server after instantiation. In some embodiments, a single configuration manager may be provided by a manager 100 for users to select to include within the machine image. In other embodiments, a plurality of configuration managers may be offered. A plurality of configuration managers may be used to support enhancements to the configuration manager while retaining old versions to ensure existing server configurations work exactly as before. A plurality of configuration managers may also be used to support multiple operating systems (e.g. Linux, FreeBSD, Solaris) or to support multiple versions of one operating system (e.g. RedHat Linux, Debian Linux, and Ubuntu Linux; or Solaris 10 and OpenSolaris).

In some embodiments, a user may be allowed to create a number of different machine images. For example, a user may want to create a number of virtual server base machine images, each with a different operating system. The user then may use each of these images to create customized virtual server instances running on each of the operating systems.

After the base machine image is created, instructions to instantiate the base machine image on at least one virtual server may be transmitted in any manner (step 303). In some embodiments, the instructions may be transmitted from a manager 100 to a virtual server service 120. In some embodiments, this transmission may be initiated by a user. For example, a manager 100 may provide a web page by which a user can access and manage a number of virtual servers on one or more virtual server services. The user can send, through the manager 100, instructions to instantiate a particular machine image. The manager 100 may then select the appropriate base image and send instructions to the virtual server service to instantiate the image.

In some embodiments, the instructions to instantiate the virtual server may be sent automatically. In these embodiments, any configuration or monitoring data either from the virtual server itself, other servers, the manager 100 or any combinations of the aforementioned data can be used to trigger the sending of instructions. For example, a manager 100 may have instructions to automatically instantiate a given machine image if usage, load, or utilization of a number of servers exceeds a threshold, or if a given virtual server fails.

In some embodiments, the instantiation instructions may comprise one or more parameters for the to-be-instantiated server. For example, the instantiation instructions may include a serial number or other identifier so that a manager 100 can identify the particular instantiation later. Or for example, the instantiation instructions may include an address for the manager 100 so that the newly instantiated server will have an address to connect to upon instantiation.

After transmitting the instructions, a manager 100 may determine the configuration manager of the instantiated virtual server is ready to receive configuration information in any manner (step 305). In some embodiments, the manager 100 may wait to receive a connection request form the instantiated server. In other embodiments, the manager 100 may periodically request a connection to the instantiated server until it succeeds. In some embodiments, the manager 100 may monitor the status of the instantiated server using a service provided through the hosted virtual server service.

In one embodiment, the instantiated server may initiate an HTTPS session with the manager 100. The instantiated server may pass to the manager 100 a serial number given to it, along with a current state of the machine. The manager 100 may then verify that the serial number corresponds to a serial number the manager sent instructions to instantiate. In other embodiments, the instantiated virtual server may be identified by any other means, including a TCP/IP source address and/or a hosted virtual server service identifier given to the instance.

After readiness is determined, configuration information for the instantiated virtual server may be transmitted in any manner (step 307). In one embodiment, the configuration information may be transmitted from the manager 100.

The configuration information may comprise any information which may be used by the virtual server instance to function, including without limitation, executables, files, parameters, and locations and types of other virtual server instances. In one embodiment, the configuration information transmitted may comprise an ordered list of executable scripts, a list of URLs pointing to files corresponding to each script, and a set of input variable bindings which may be used and accessed by the scripts during their execution. In this embodiment, the files corresponding to each script may comprise any files utilized by each script, including without limitation configuration files, application packages to install, executable files, and application data (e.g. a database snapshot).

After the configuration information is transmitted, the virtual server instance may then take any steps necessary to implement the received configuration information. The example below continues the embodiment described above in which a manager 100 has transmitted an ordered list of executable scripts, a list of URLs pointing to files corresponding to each script, and a set of input variable bindings.

An instance may first place each script into an executable file in the local filesystem, and download each attachment named in the configuration file from the provided URL to also store in the local filesystem. The attachments may each be stored in a separate directory for each script. Each script may then be run in turn, with each script passed the input variable bindings required by the script. These bindings may include a number of global variables, such as the machine image id, the instance id, the IP addresses assigned to the instance, and the location of the attachments for the script. If any errors occur (e.g. a script exits with an error) the process may be aborted.

In some embodiments, the execution of the configuration process may itself be determined by earlier steps in the configuration process. For example, a configuration script may produce an input parameter used in a later configuration script. Or, for example, a configuration script may execute to determine which of a set of configuration scripts should be executed, and in what order. In some embodiments, a configuration process may specify that one or more other virtual servers be launched, terminated, or otherwise affected based on the configuration process. In these embodiments, the virtual server executing the configuration process may send signals directly to the servers affected, or the virtual server may send instructions to a manager 100.

After configuration is complete, an instance may signal the manager 100 the outcome of the configuration process, which is "success" if all scripts executed without error, and "stranded" if a script exited with an error. This signaling may be done via any manner, and may use the same method and/or connection used to transfer the configuration information. In addition, for troubleshooting purposes the instance may transmit any number of configuration status updates, including, for example, the UNIX standard output and error output of each script.

To give another configuration example, when deploying multi-server configurations it is often necessary to configure one server with information that depends on the state of the second server. For example, the first server may need to connect to the second server and for this purpose it may need to know the IP address of the second server. In these cases, particular challenges may be faced if the first and second servers are launched substantially simultaneously, or if the two servers have mutual dependencies (in such a case a deadlock may occur if both servers have to wait for information from the other server before producing the information the other server needs). Such inter-server dependencies may be handled by transmitting to the configuration manager incomplete information. Specifically, certain inputs may be marked as "missing." The configuration manager proceeds with the configuration steps but checks for the presence of all required inputs before running each specific script. If one or multiple inputs are missing, the configuration manager transmits any state information it may have to the manager 100 and then periodically queries the manager 100 for the missing input values. When it receives the missing values, it proceeds running the scripts.

In multi-server configurations, the dependencies between servers may change over time. Continuing the above example, if the second server fails and a replacement server is launched, then the configuration of the first server needs to be changed to update the dependent information. In addition, certain processes may need to be signaled or restarted so they re-read the configuration information. In one embodiment, after the initial configuration the configuration manager can poll the manager 100 periodically to inquire whether any reconfiguration actions are required. If so, the manager's 100 response to the poll may contain configuration information similar to the type transmitted at boot time and the configuration manager executes the requested scripts in the same manner to update the virtual server configuration. In another embodiment, instead of having the configuration manager poll periodically, the manager 100 can open a connection to the server to send the required information.

Figure 4:
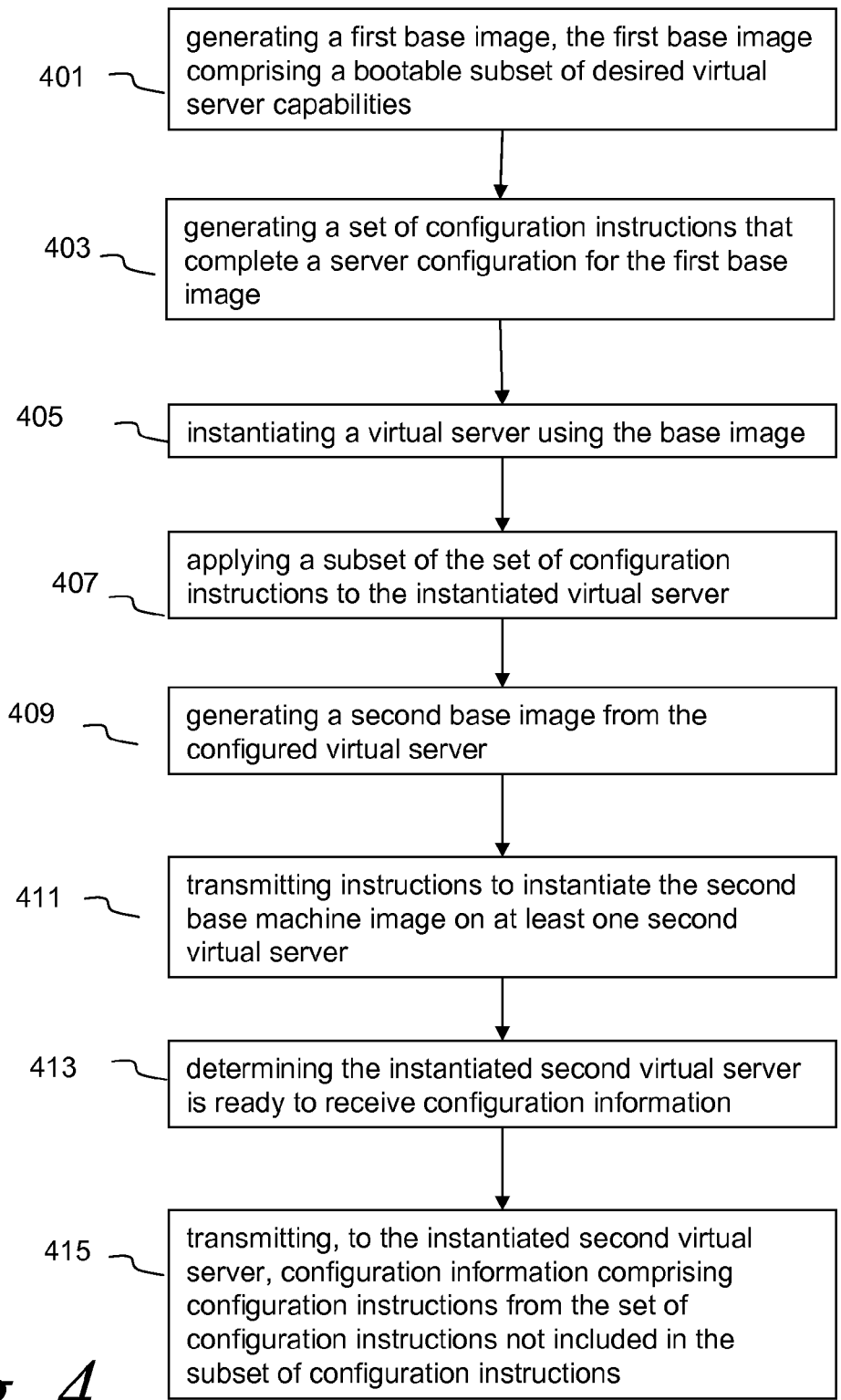
FIG. 4 is a flow diagram of one embodiment of a method for reducing the time taken to create configurable virtual server instances from machine images.

Now referring to FIG. 4, a flow diagram of one embodiment of a method for reducing the time taken to create configurable virtual server instances from machine images is shown. In brief overview, the method comprises: generating a first base image, the first base image comprising a bootable subset of desired virtual server capabilities (step 401); generating a set of configuration instructions that complete a server configuration for the first base image (step 403); instantiating a virtual server using the base image (step 405); applying a subset of the set of configuration instructions to the instantiated virtual server (step 407); generating a second base image from the configured virtual server (step 409);

transmitting instructions to instantiate the second base machine image on at least one second virtual server (step 411); determining the instantiated second virtual server is ready to receive configuration information (step 413); and transmitting, to the instantiated second virtual server, configuration information comprising configuration instructions from the set of configuration instructions not included in the subset of configuration instructions (step 415).

Still referring to FIG. 4, now in greater detail, the process of instantiating virtual servers using a manager 100 as described above may take additional time depending on the amount of configuration information to be transmitted and the number of scripts to be run. Thus it may be desirable to create base images which have built in a subset of the configuration information. The method shown in FIG. 4 may be used to efficiently produce and instantiate such modified base images.

A first base image, the first base image comprising a bootable subset of desired virtual server capabilities, may be generated using any method. (step 401). The first base image may be created using any of the techniques described above.

A set of configuration instructions that complete a server configuration for the first base image may be generated in any manner (step 403). The set of configuration instructions may comprise any of the configuration information described herein, including without limitation scripts, parameters, and associated files. In some embodiments, the configuration instructions may be generated automatically in response to user input specifying a desired configuration. In some embodiments, the configuration instructions may be generated by a manager 100 in response to receiving user input via a web interface.

A virtual server may then be instantiated using the base image in any manner (step 405). In some embodiments, the virtual server may be instantiated on a hosted virtual server service. In other embodiments, the virtual server may be instantiated in a test or build environment. In still other embodiments, the virtual server may be instantiated on a manager 100.

After instantiation, a subset of the set of configuration instructions may be applied to the instantiated virtual server (step 407). In some embodiments, a manager 100 may transmit the subset of configuration instructions to the instantiated virtual server. The subset of the set of configuration instructions may be chosen in any manner. In some embodiments, a user may select the subset. In some embodiments, the subset may be selected based on how common the instructions in the subset are. For example, the subset may comprise the most commonly used configuration instructions. In other embodiments, the subset may be selected based on how quickly the instructions can be executed by an instantiated virtual server. For example, the subset may comprise the configurations instructions that take the longest to be executed by a virtual server.

A second base image may then be generated from the configured virtual server (step 409). The second base image may be produced by any technique for generating a base image. In some embodiments, the configured virtual server may suspend or stop execution while a copy is made of the executable code and accompanying files comprising the configured virtual server.

Instructions to instantiate the second base machine image on at least one second virtual server may then be transmitted (step 411). In one embodiment, the instructions to instantiate the second base machine image may be transmitted from a manager 100 to a hosted virtual server service. For example, the instructions may be transmitted to a hosted virtual server service either in direct response to a user request or as part of an automatic instantiation process set up by a user.

A manager 100 may then determine the instantiated second virtual server is ready to receive configuration information (step 413). This determination may be made using any technique or system described herein, including for example, receiving a transmission from a configuration manager executing in the second virtual server.

After the determination, a manager 100 may transmit, to the instantiated second virtual server, configuration information comprising configuration instructions from the set of configuration instructions not included in the subset of configuration instructions (step 415). Transmission of configuration instructions may be done in any manner and using any protocol or protocols. After the second virtual server receives the configuration instructions, the second virtual server may apply the configuration instructions using any technique described herein.

Now referring to FIGS. 5A, 5B, 5C, 5D, 5E, 5F, and 5G, example screenshots of one embodiment of a configuration and instantiation interface to a hosted virtual server service are shown. Each of these figures will be discussed in detail in conjunction with the description of FIGS. 6A, 6B, and 7 below.

Figure 6A:
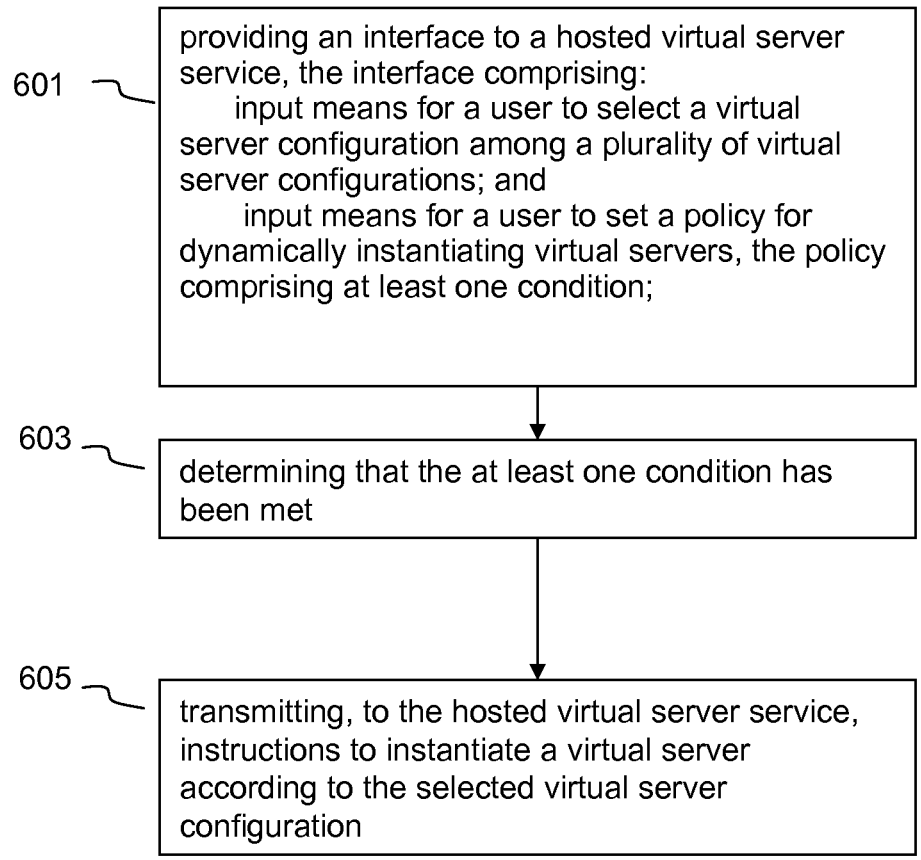
FIG. 6A is a flow diagram of a first embodiment of a method for providing a configuration and instantiation interface to a hosted virtual server service.

Now referring to FIG. 6A, a flow diagram of a first embodiment of a method for providing a configuration and instantiation interface to a hosted virtual server service is shown. In brief overview, a manager 100 may provide an interface to a hosted virtual server service (step 601). The interface includes inputs for a user to select a virtual server configuration among a plurality of virtual server configurations; and inputs for a user to set a policy for dynamically instantiating virtual servers, the policy comprising at least one condition. The manager 100 may then determine that the at least one condition has been met (step 603); and transmit, to the hosted virtual server service, instructions to instantiate a virtual server according to the selected virtual server configuration (step 605).

Still referring to FIG. 6A, now in greater detail, an interface to a hosted virtual server service may be provided in any manner. In some embodiments, the interface may comprise a web-based graphical interface. Such an interface may comprise any graphical interface capable of being displayed via a web browser, including without limitation any combination of HTML, Javascript, XML, images, text, Java Applets, and/or SVG. In other embodiments, the interface may comprise a command-line interface. In still other embodiments, the interface may be a combination of graphical and textual inputs. The interface may be provided by any computing device or devices, including without limitation a manager 100, user station 102, or any combination thereof. For example, a manager 100 may transmit a number of web pages to a user station 102, and the user station may display the pages and transmit user input back to the manager 100.

An interface may include any inputs for a user to select a virtual server configuration among a plurality of virtual server configurations. In some embodiments, a user may select among a number of configurations from a menu. In other embodiments, a user may enter the names of one or more virtual server configurations. In still other embodiments, a user may transmit any data corresponding to a virtual server configuration as part of the selection, including without limitation variables, configuration scripts, and server images. For example, a menu may provide an option to select among previously uploaded server configurations or to upload a new virtual server image and/or configuration. In some embodiments, an interface may allow a user to select from virtual server configurations created and shared by other users. For example, a user may create a particularly useful configuration for hosting an e-commerce site. The user may then designate that configuration as shared, and thus allow other users to use that configuration. In some embodiments, the use may be predicated on license terms and/or payments to the author of the configuration.

Referring back to FIG. 5A, an example menu allowing a user to select among a plurality of public and private server configurations is shown. The private server configurations may have been created and/or modified by the user. The public/premium server configurations may represent server configurations created and shared by others, or server configurations made available by an administrator of the interface. In some embodiments, there may be a charge assessed to the user for using certain public/premium server configurations.

Figure 5B:
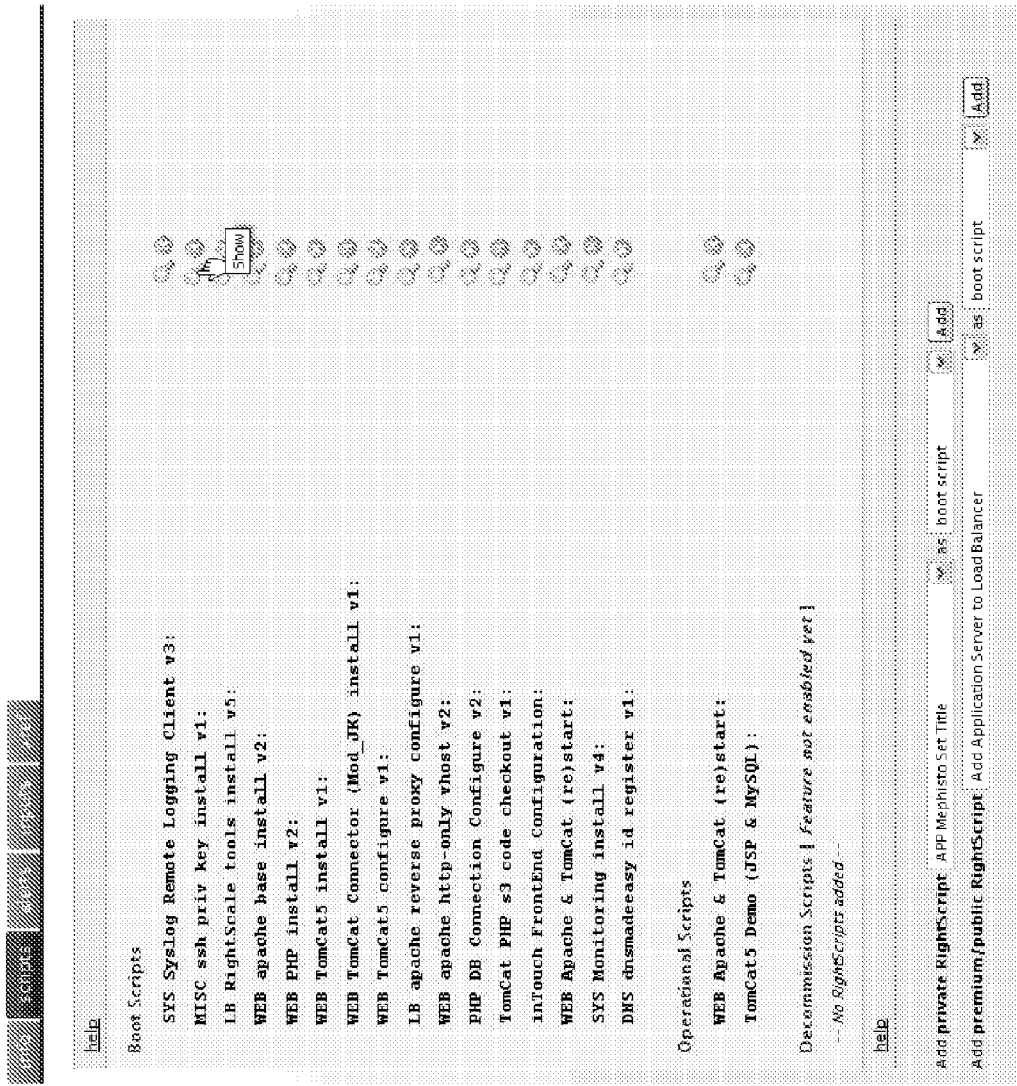

Referring to FIG. 5B, an interface may also allow a user to view one or more boot scripts associated with a server configuration. The user may then be able to view, select, remove, or modify the boot scripts. A user may also be able to add scripts to a server configuration, including both scripts created by the user or scripts made publicly available.

An interface may also include any inputs for a user to set a policy for dynamically instantiating virtual servers, the policy having at least one condition. A policy may comprise any combination of conditions and actions. A condition may relate to any variable or variables, including without limitation virtual server usage, hosted virtual server service parameters, time of day, date, receipt of transmissions for virtual servers, state of message queues (e.g. size or age), and signals sent from an application executing on a virtual (i.e., the application may decide internally when additional servers are required). Conditions relating to virtual server utilization may use any parameter or combination of parameters of virtual server usage, including without limitation processor load, bandwidth usage, active connections, memory load, maximum response time, and average response time disk utilization, system temperature and other environmental factors, hardware health indicators such as memory error rates, disk error/retry rates, power supply levels.

Referring now to FIG. 5C an example interface is shown which allow a user to select policies and conditions. FIG. 5C illustrates a number of policies with conditions that may be enabled for managing a virtual servers. For example, the first policy causes a "scale-up" event to be generated when cpu idle time for a virtual server falls below 50% for 3 minutes. The scale-up event may be received by a manager 100 (or generated by the manager 100 in cases where the manager 100 is directly monitoring the virtual servers) which may then send instructions to the virtual server service to instantiate a new image of the currently heavily loaded virtual server. The second policy in the list of FIG. 5C causes a "scale-down" event to be generated when cpu idle time for a virtual server rises above 80% for 10 minutes. The scale-down event may be received by a manager 100 (or generated by the manager 100 in cases where the manager 100 is directly monitoring the virtual servers) which may then send instructions to the virtual server service to remove an instance of the under-utilized virtual server. For example, the third policy directs that a critical event be generated if a virtual server is in a stranded state for over 1 minute. The critical event may be received by a manager (or generated by the manager 100 in cases where the manager 100 is directly monitoring the virtual servers) 100 and logged or the manger 100 may have specific procedure for the handling of critical events.

In some embodiments, a condition may relate to a failure of one or more virtual servers. For example, a condition may provide for the instantiation of a new virtual server upon failure of a running virtual server instance. In these embodiments, failure may include any type of failure of the virtual server including without limitation a crash, suspension of execution, communication failure, failure to respond to a message, failure to service a request, corruption, and/or involuntary shut down. In some embodiments, a condition may relate to a predicted failure of a virtual server. In these embodiments, a failure may be predicted by any means, including without limitation based on recoverable error rates such as the error rate of memory with error checking codes (ECC), or the various error rates of disks (typically monitored using the SMART standard). Failures may also be predicted based on non-recoverable errors, for example spontaneous machine reboots. For example, a policy may decommission a server after anywhere between 5 and 20 unexpected reboots (which are typically initiated by hardware checks), and instantiate a replacement.

For example, a policy may specify an action of instantiating a new virtual server anytime a condition of virtual server usage climbing above a threshold is true. Or for example, a policy may specify an action of terminating a number of virtual server instances at 7:00 PM. In some embodiments, a policy may specify a total number of virtual servers to maintain at any given time. For example, a policy may state that at 6 am at least 4 servers must be running, which may require the launch of 0 to 4 servers. The policy can also express that at most 20 may be running, e.g. to limit the total cost. In some embodiments, a policy may combine the state of multiple servers, for example, if the minimum requests served per second across all servers is above 100/sec, then launch an additional server. In other embodiments, any combination of the above policies may be applied. For example, a policy may require at least 4 servers running at 7 am, that one additional server is launched if the average CPU utilization is over 40% for running servers, and require that at most 10 servers may be running at any point in time.

Figure 5D:
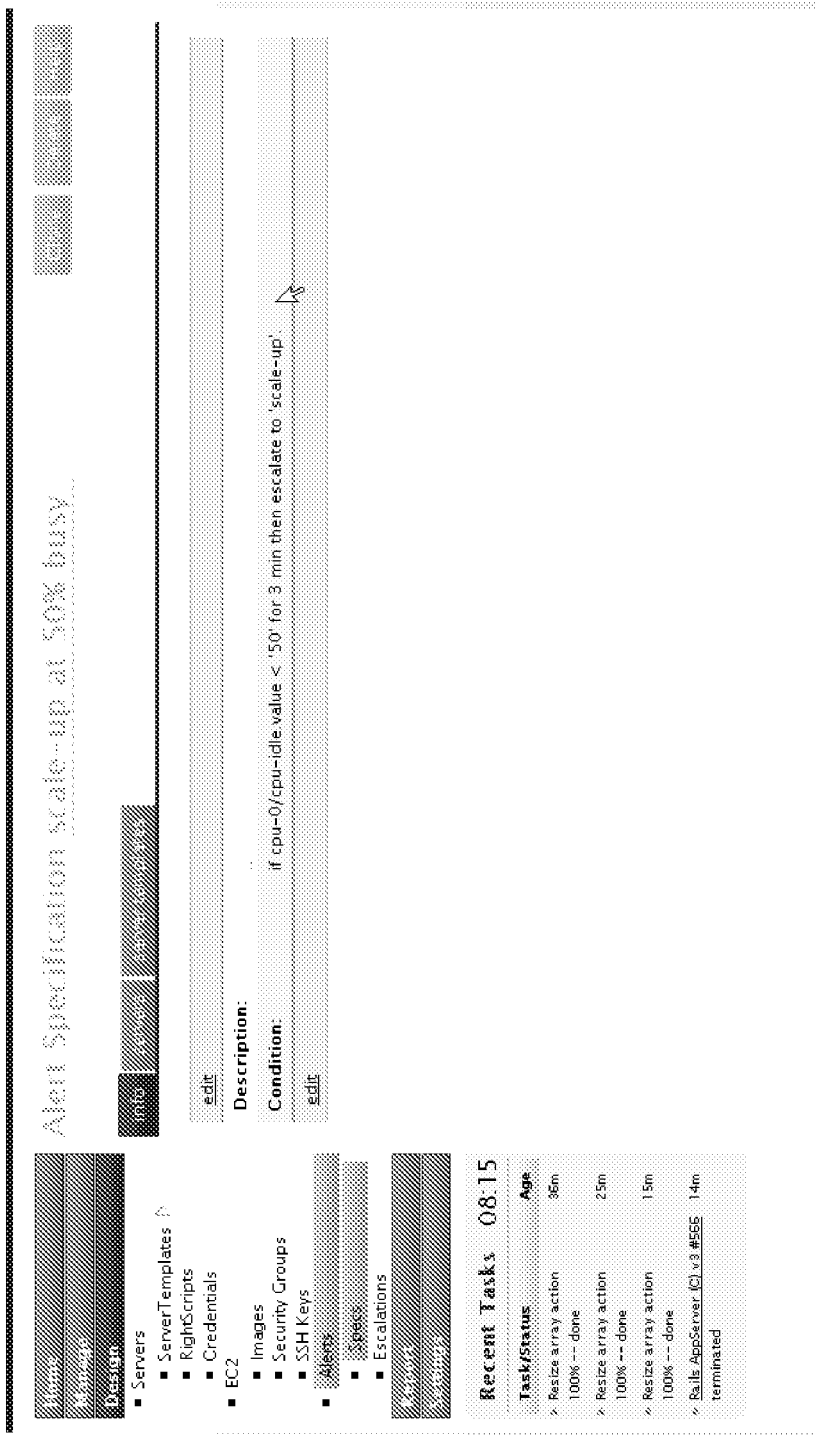
Figure 5E:
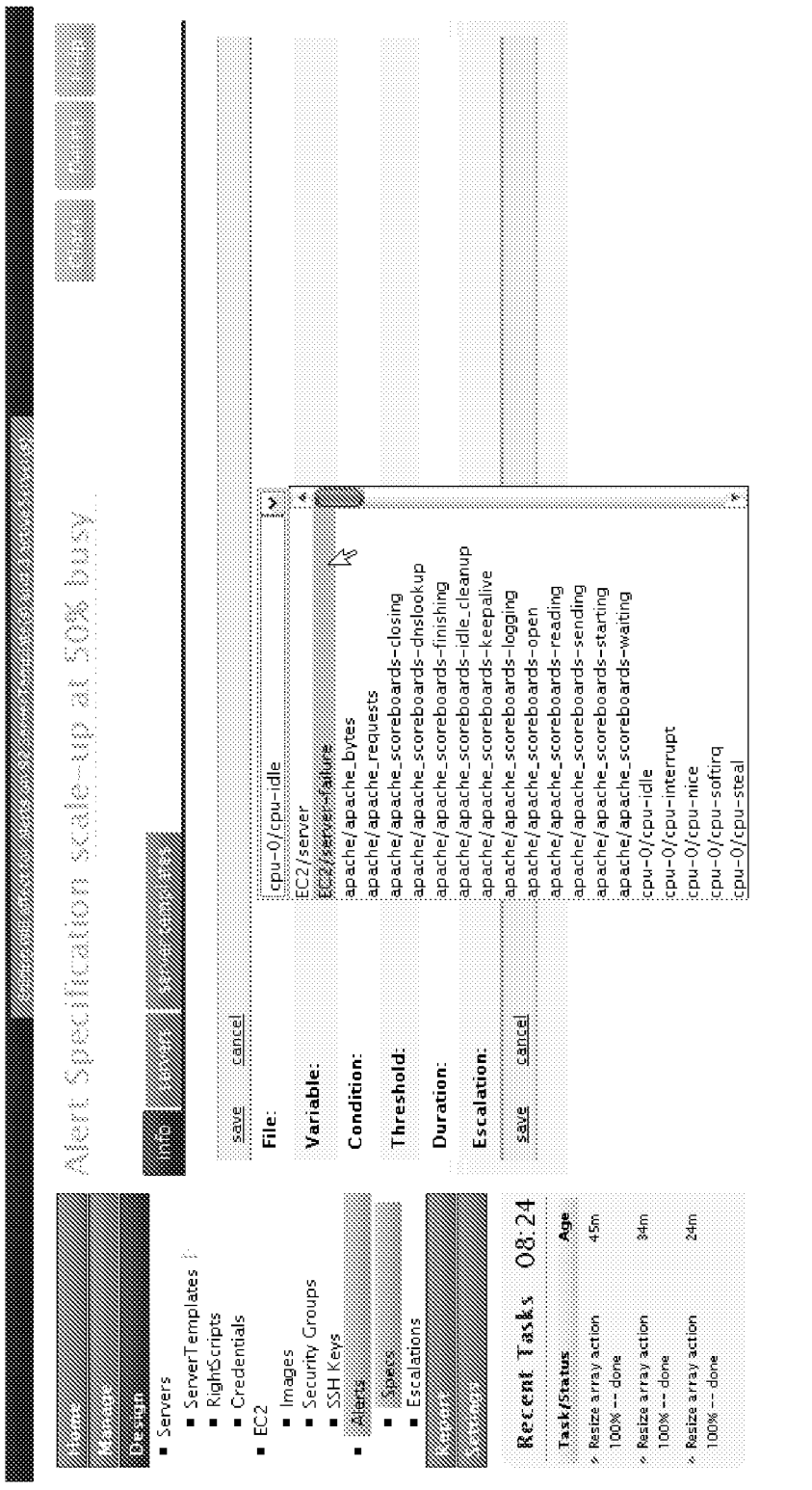

FIGS. 5D and 5E depict an example interface allowing a user to edit and create policies. In configuring the policy, a user may select a variable in a file where real-time monitoring data is collected. A user may select a variable, condition, threshold, duration, and escalation action for the policy. The user selection may be accomplished via any inputs including, without limitation, menus, checkboxes, textboxes, links, drag-and-drop interfaces, and sliders.

Figure 5F:
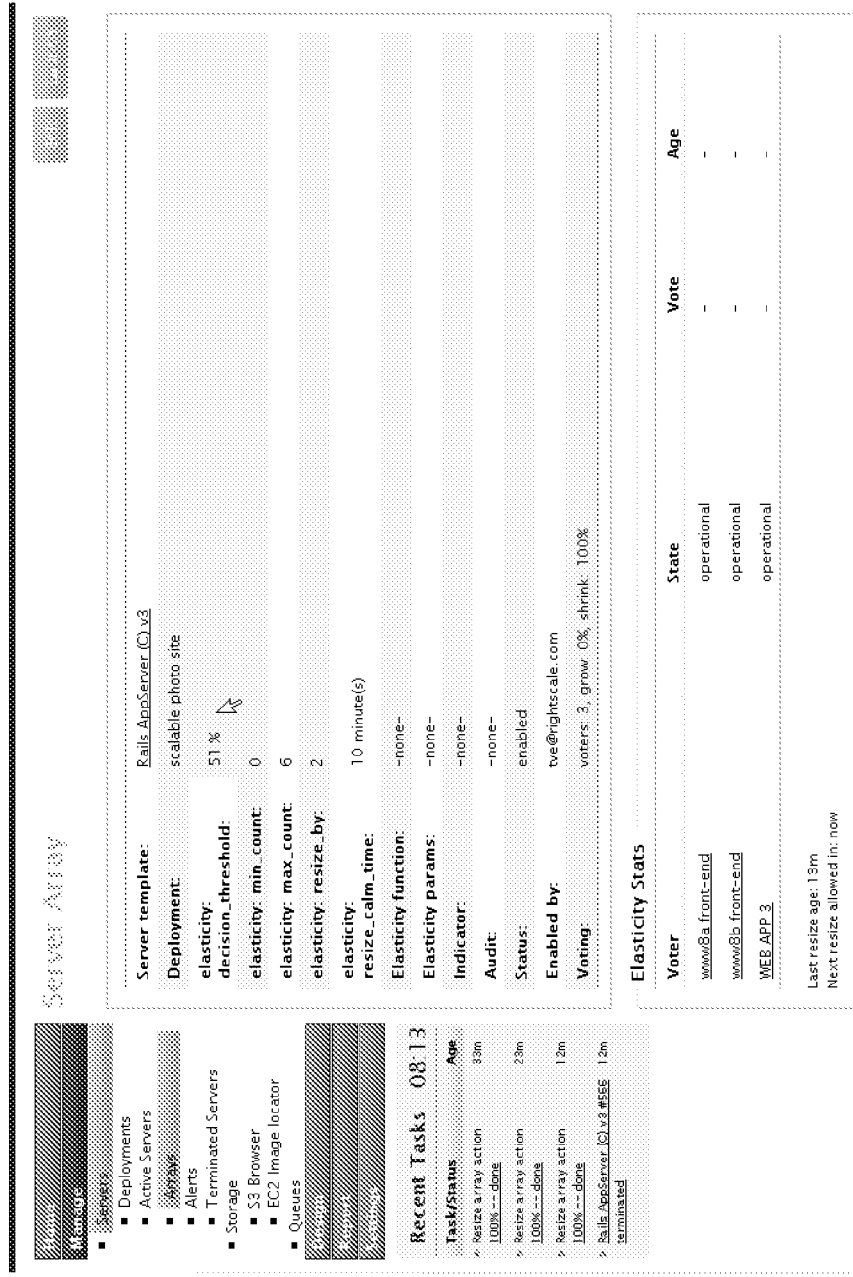

FIG. 5F depicts an example interface which allows a user to set policies for an array of servers. For example, an array may have an elasticity threshold, which defines which fraction of servers must generate an event to grow or shrink the array before the change takes place. In the example shown, the array is grown or shrunk if a scale-up, respectively scale-down, event is generated for at least 51% of the servers. The array may be grown or shrunk by predetermined numbers of servers, and may have hard upper and lower bounds on the number of virtual servers that may run at one time. The array may also have a cooldown time required in between resizing events.

Figure 5G:
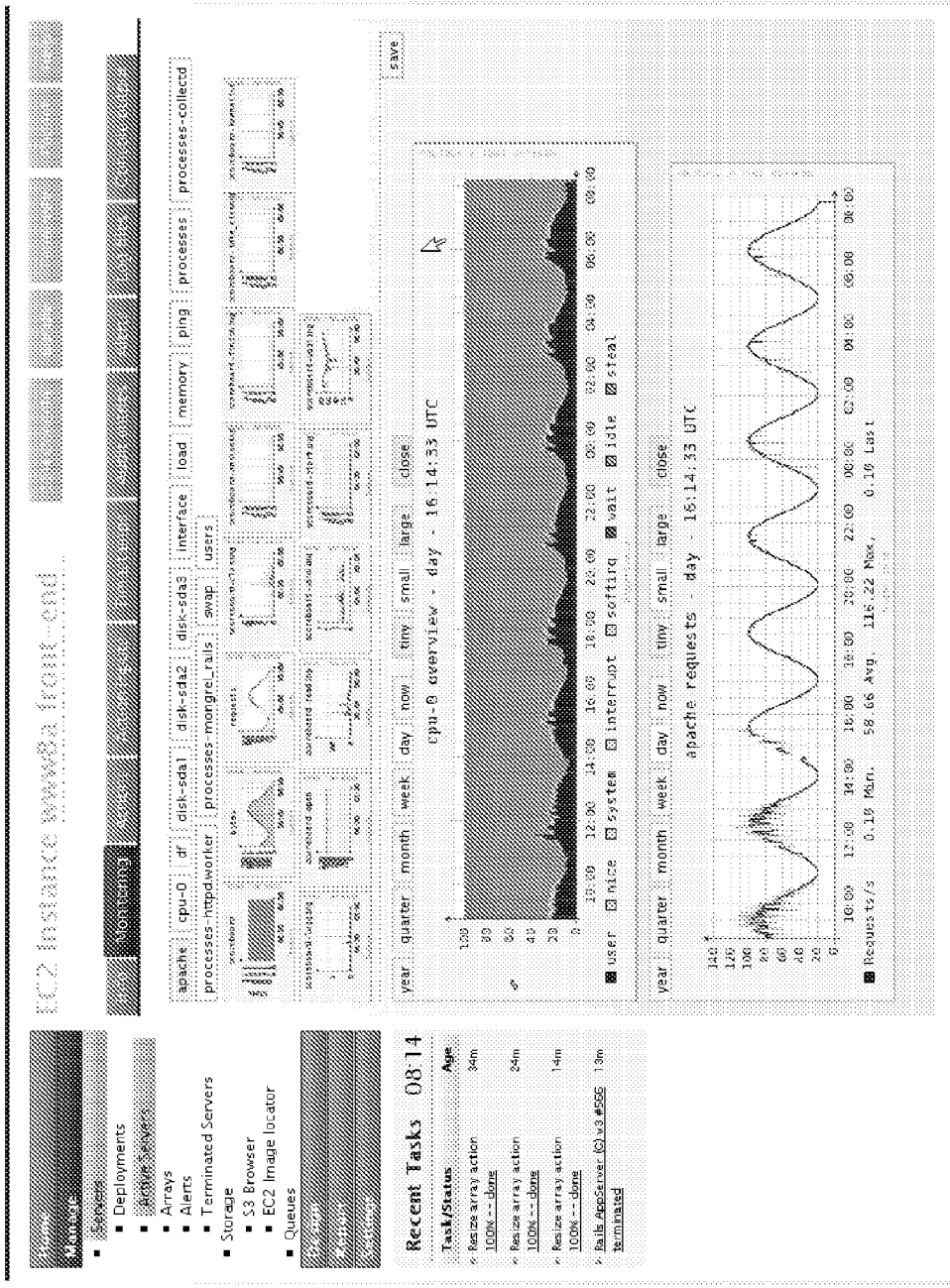

Referring now to FIG. 5G, in some embodiments, a display may be provided which shows usage statistics for one or more virtual server instances to a user. The display may present any statistics in any format, including without limitation graphs, histograms, charts, animations and text. In some embodiments, the display may illustrate specific parameters which a user desires to use in configuring one or more policies. For example, a user may consult CPU utilization trends over a one-month period to determine a threshold for a policy to add additional server instances based on CPU utilization.

Figure 6B:
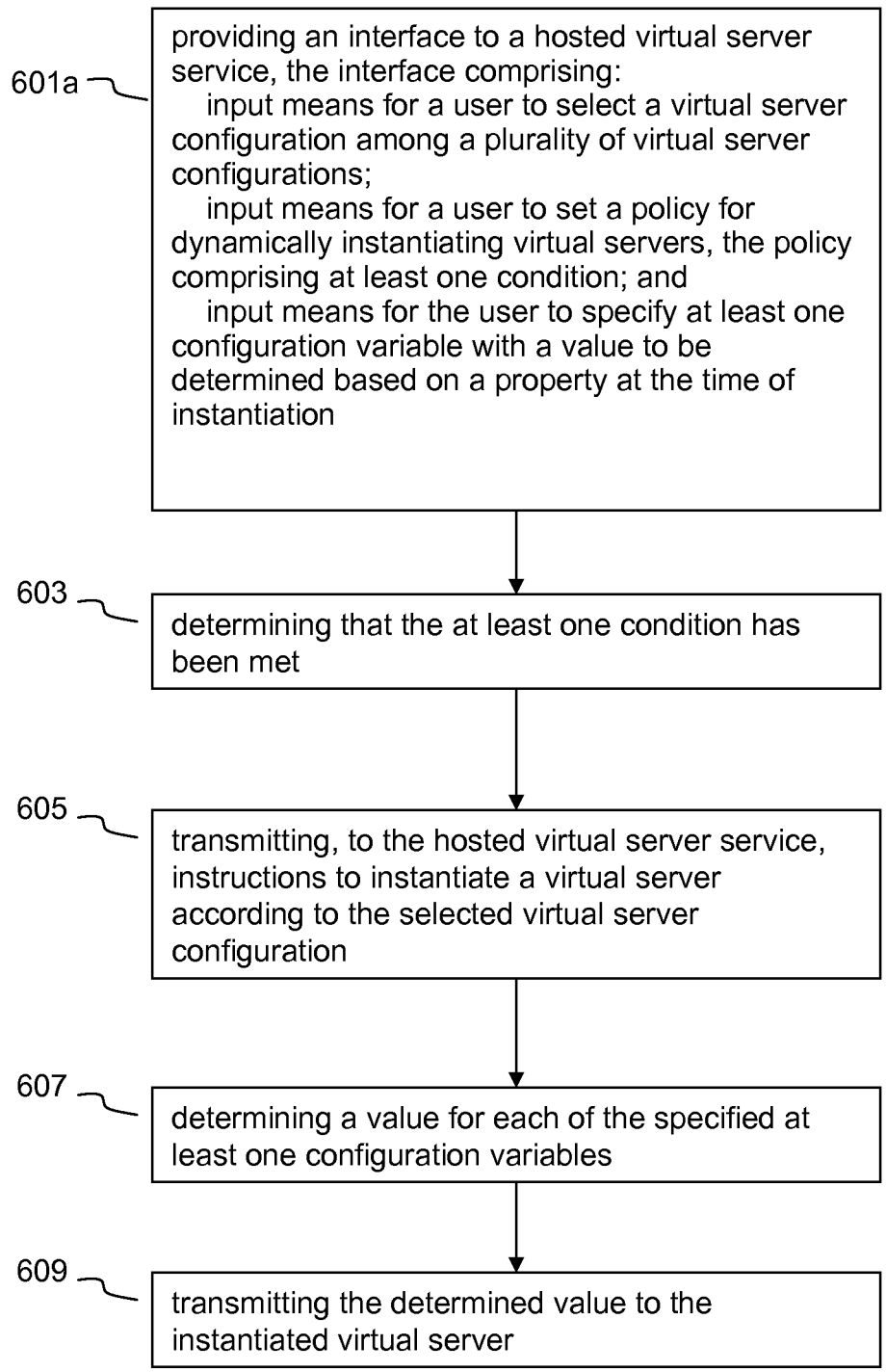
FIG. 6B is a flow diagram of a second embodiment of a method for providing a configuration and instantiation interface to a hosted virtual server service.

Referring ahead to FIG. 6B, in some embodiments, an interface may accept input of one or more configuration variables with a value to be determined based on a property at the time of instantiation (step 601a). The property may comprise any value that be determined at instantiation time, including without limitation names, addresses, and configuration information of other instantiated virtual servers, properties of the hosted virtual server service, properties of the manager 100, utilization parameters of one or more instantiated virtual servers, or the exact conditions that triggered the launch of the server.

Referring back to FIG. 6A, a manager 100 may then determine that the at least one condition has been met (step 603) in any manner. In some embodiments, the manager 100 may receive data from the hosted virtual server service to determine whether the condition has been met. In other embodiments, the manager 100 may determine internally that the condition has been met, such as by checking a system time. In still other embodiments, the manager 100 may determine whether a condition has been met by receiving data from one or more instantiated virtual servers.

After the condition has been met, the manager 100 may transmit, to the hosted virtual server service, instructions to instantiate a virtual server according to the selected virtual server configuration (step 605). The instructions may comprise any information regarding the virtual server's configuration or instantiation. In some embodiments, the instructions may comprise one or more variables determined at the time the instructions are transmitted. In still other embodiments, the instructions may be to instantiate a virtual server with a configuration manager which then configures the instantiated virtual server in any manner described herein.

Referring ahead to FIG. 6B, in some embodiments, after transmitting the instructions, a manager 100 may determine the value of one or more variables (step 607). The manager 100 may then transmit the values of those variables to the instantiated virtual server.

Figure 7:
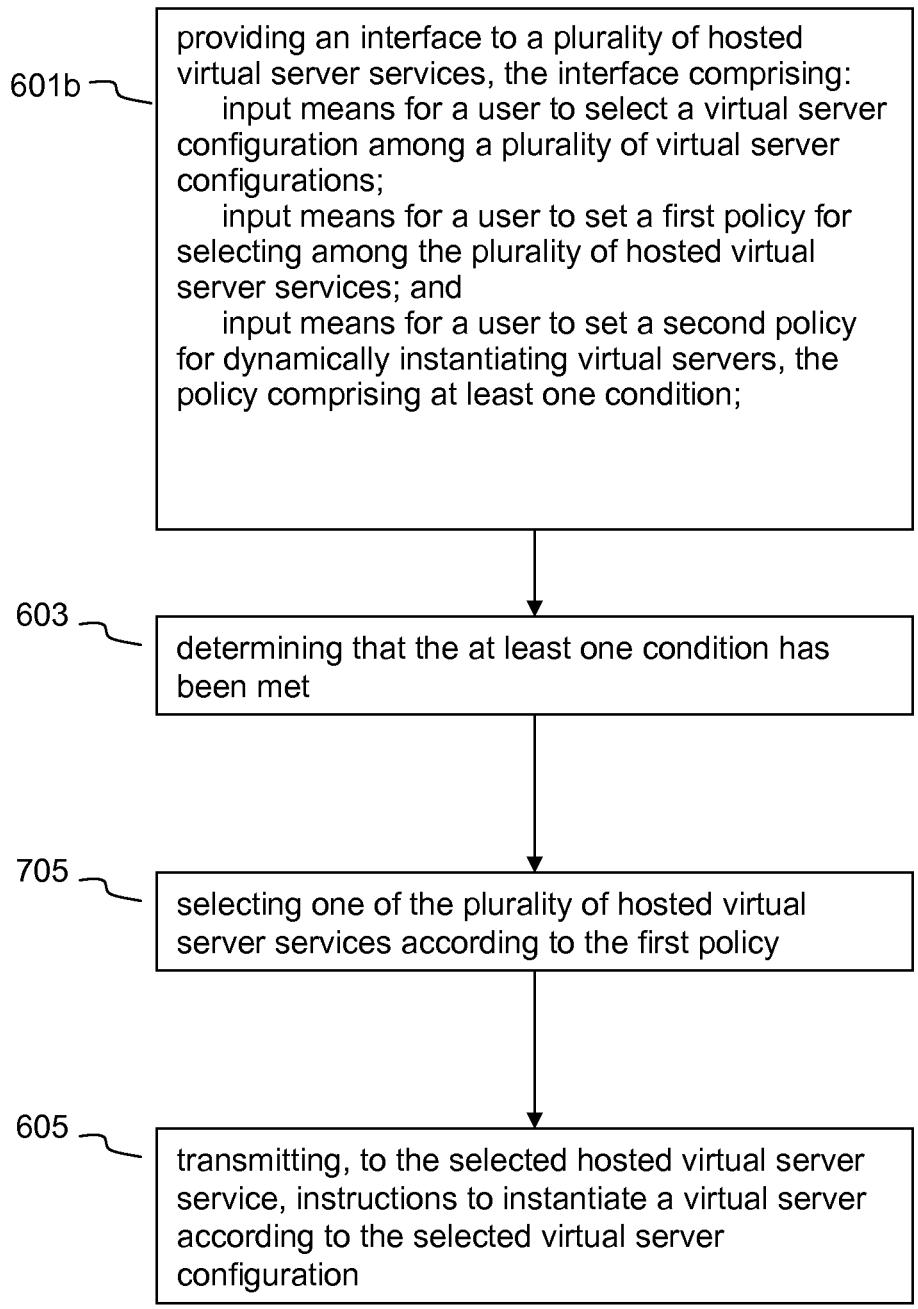
FIG. 7 is a flow diagram of a third embodiment of a method for providing a configuration and instantiation interface to a hosted virtual server service.

Referring now to FIG. 7, a method for providing a configuration and instantiation interface to a plurality of hosted virtual server services is shown. In brief overview, the method shown is similar to the method of FIGS. 6A and 6B, with the addition of the interface accepting input of a policy for selecting among a plurality of hosted virtual server services (step 601b). The method may then include selecting, according to the policy, one of a plurality of hosted virtual server services to instantiate a virtual server on (step 705).

Still referring to FIG. 7, an interface may be provided in any manner described herein (step 601b). The interface may comprise any inputs for a user to specify a policy for selecting among hosted virtual server services. A policy may specify any attribute of a virtual server service, including without limitation performance, cost, usage, and latency. For example, a policy may select among a plurality of services based on which one provides the best performance/price tradeoff. Or for example, a policy may select among a plurality of services based upon the type of virtual server to be instantiated.

After the condition has been met (step 603), a manager may then select one of the plurality of hosted virtual server services according to the first policy (step 705). The manager may receive any information, send any requests, or compute any parameters in the course of making the selection. The manager may then transmit the instantiation instructions to the selected service (step 605).

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for providing a configuration and instantiation interface to a hosted virtual server service, the method comprising:
   providing, by a virtual server manager, an interface to a plurality of hosted virtual server services, each of the plurality of hosted virtual server services comprising a plurality of physical machines each hosting one or more virtual servers, the interface comprising:
      input means allowing a user to select one or more virtual server configurations from among a plurality of virtual server configurations, each virtual server configuration comprising a boot image and configuration information; and
      input means for a user to set a policy for dynamically selecting one of the plurality of hosted virtual server services and for dynamically instantiating one or more virtual servers on the selected hosted virtual server service using the selected one or more virtual server configurations, the policy comprising at least one condition;
   determining, by the virtual server manager, that the at least one condition has been met;
   transmitting, by the virtual server manager, responsive to determining that the at least one condition has been met, to one of the plurality of hosted virtual server services, instructions to instantiate a first virtual server according to a first selected virtual server configuration boot image and instructions to instantiate a second virtual server according to a second selected virtual server configuration boot image;
   determining, by the virtual server manager, that instantiation of the first boot image and the second boot image on the physical machines comprising the one of the plurality of hosted virtual server services is complete; and
   transmitting, by the virtual server manager, responsive to determining that instantiation of the boot images is complete, respective configuration information to the instantiated boot images, wherein an information item in the second virtual server configuration information depends on the first virtual server configuration and the virtual server manager obtains a value for the information item from the first virtual server, wherein the virtual server manager initially transmits incomplete configuration information to the second virtual server and subsequently transmits the obtained value.

2. The method of claim 1, wherein at least one of the hosted virtual server services is a third-party hosted virtual server service.

3. The method of claim 2, wherein providing comprises providing, on a subscription basis, one interface to the plurality of hosted virtual server services.

4. The method of claim 1, wherein the condition specifies one or more parameters, each parameter indicating a utilization of one or more virtual servers.

5. The method of claim 4, wherein determining that the at least one condition has been met comprises receiving information indicating a value of the one or more parameters; and determining the value exceeds a threshold specified by the condition.

6. The method of claim 5, further comprising: receiving information indicating a second measurement of a virtual server utilization parameter; determining the measurement is below a threshold specified by the condition; and transmitting, to the one of the plurality of hosted virtual server services, instructions to terminate a virtual server instance.

7. The method of claim 1, wherein the interface comprises input means for a user to configure at least one policy for dynamically scaling virtual server instantiations responsive to a network utilization parameter.

8. The method of claim 1, wherein the condition comprises a failure of an instantiated virtual server.

9. The method of claim 1, wherein the condition comprises a predicted failure of an instantiated virtual server.

10. The method of claim 1, wherein the plurality of virtual server configurations comprise at least one virtual server configuration created by a second user.

11. The method of claim 1, wherein the interface further comprises inputs allowing a user to share created virtual server configurations with other users.

12. The method of claim 1, wherein the input means for a user to select a virtual server configuration comprise input means for the user to specify at least one configuration variable with a value to be determined based on a property of at least one other instantiated virtual server at the time of instantiation.

13. The method of claim 12, further comprising the steps of:
determining a value for each of the specified at least one configuration variables; and
transmitting the determined value to the instantiated virtual server.

14. The method of claim 1, wherein the input means for a user to select a virtual server configuration comprise input means for the user to specify at least one configuration variable with a value to be determined based on a property of the hosted virtual server service at the time of instantiation.

15. The method of claim 14, further comprising the steps of:
determining a value for each of the specified at least one configuration variables; and
transmitting the determined value to the instantiated virtual server.

16. A system for providing a configuration and instantiation interface to a hosted virtual server service, the system comprising:
a web server which provides an interface to a plurality of hosted virtual server services, each of the plurality of hosted virtual server service comprising a plurality of physical machines each of which hosts at least one virtual server, the interface comprising:
input means allowing a user to select one or more virtual server configurations from among a plurality of virtual server configurations, each virtual server configuration comprising a boot image and configuration information; and
input means for a user to set a policy for dynamically selecting one of the plurality of hosted virtual server services and for dynamically instantiating one or more virtual servers on the selected hosted virtual server service using the selected one or more virtual server configurations, the policy comprising at least one condition;
a computing device, in communication with the web server, which determines that the at least one condition has been met; transmits, responsive to determining that the at least one condition has been met, to one of the plurality of hosted virtual server services, instructions to instantiate a first virtual server according to a first selected virtual server configuration boot image and instructions to instantiate a second virtual server according to a second selected virtual server configuration boot image; determines that instantiation of the first boot image and the second boot image on the physical machines comprising the selected one of the plurality of hosted virtual server services is complete; and transmits, responsive to determining that instantiation of the boot images is complete, respective configuration information to the instantiated boot images,
wherein an information item in the second virtual server configuration information depends on the first virtual server configuration and the computing device obtains a value for the information item from the first virtual server, wherein the computing device initially transmits incomplete configuration information to the second virtual server and subsequently transmits the obtained value.

17. The system of claim 16, wherein at least one of the plurality of hosted virtual server services is a third-party hosted virtual server service.

18. The system of claim 16, wherein the condition specifies one or more parameters, each parameter indicating a utilization of one or more virtual servers.

19. The system of claim 18, wherein the computing device receives information indicating a value of the one or more parameters; and determines the value exceeds a threshold specified by the condition.

20. The system of claim 19, wherein the computing device receives information indicating a second measurement of a virtual server utilization parameter; determines the measurement is below a threshold specified by the condition; and transmits, to the one of the plurality of hosted virtual server services, instructions to terminate a virtual server instance.

21. The system of claim 16, wherein the interface comprises input means for a user to configure at least one policy for dynamically scaling virtual server instantiations responsive to a network utilization parameter.

22. The system of claim 16, wherein the condition comprises a failure of an instantiated virtual server.

23. The system of claim 16, wherein the condition comprises a predicted failure of an instantiated virtual server.

24. The system of claim 16, wherein the plurality of virtual server configurations comprise at least one virtual server configuration created by a second user.

25. The system of claim 16, wherein the interface further comprises inputs allowing a user to share created virtual server configurations with other users.

* * * * *

UNITED STATES PATENT AND TRADEMARK OFFICE
CERTIFICATE OF CORRECTION

PATENT NO. : 8,489,995 B2
APPLICATION NO. : 12/050865
DATED : July 16, 2013
INVENTOR(S) : Von Eicken et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this
Sixth Day of January, 2015

Michelle K. Lee
*Deputy Director of the United States Patent and Trademark Office*